Figure 7:
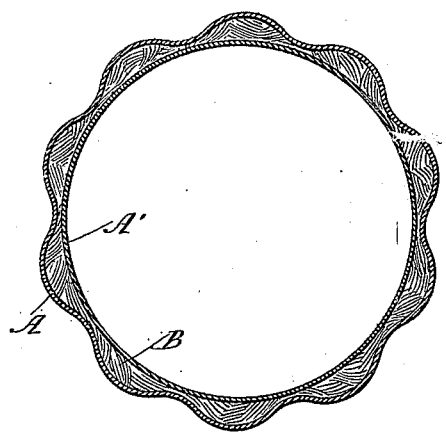

(No Model.)   3 Sheets—Sheet 1.
W. C. THAYER.
PORTABLE REFRIGERATOR.
No. 333,264.   Patented Dec. 29, 1885.
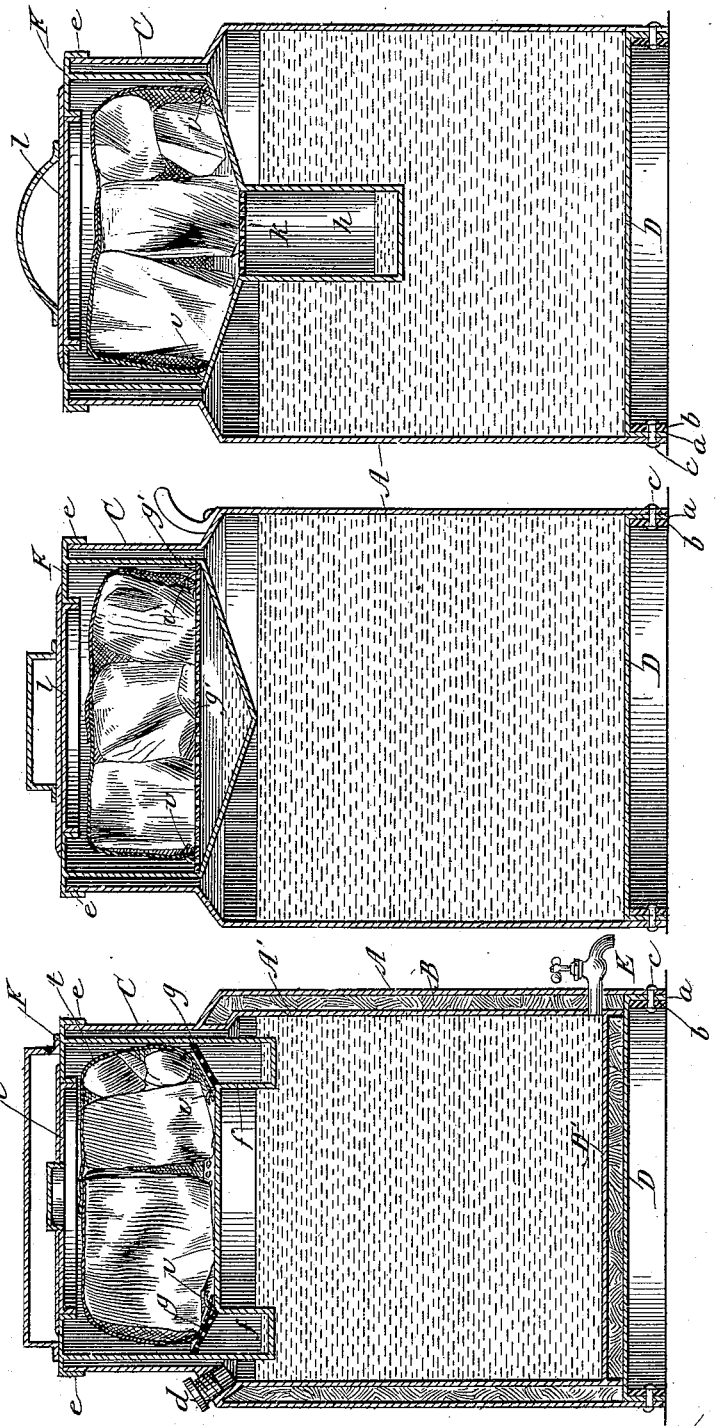
Witnesses:
Frank J. Blanchard
Louis Nolting
Inventor:
William C. Thayer
By W. H. Lotz & Co.
Attorneys.

(No Model.)  
3 Sheets—Sheet 2.
W. C. THAYER.
PORTABLE REFRIGERATOR.
No. 333,264.          Patented Dec. 29, 1885.
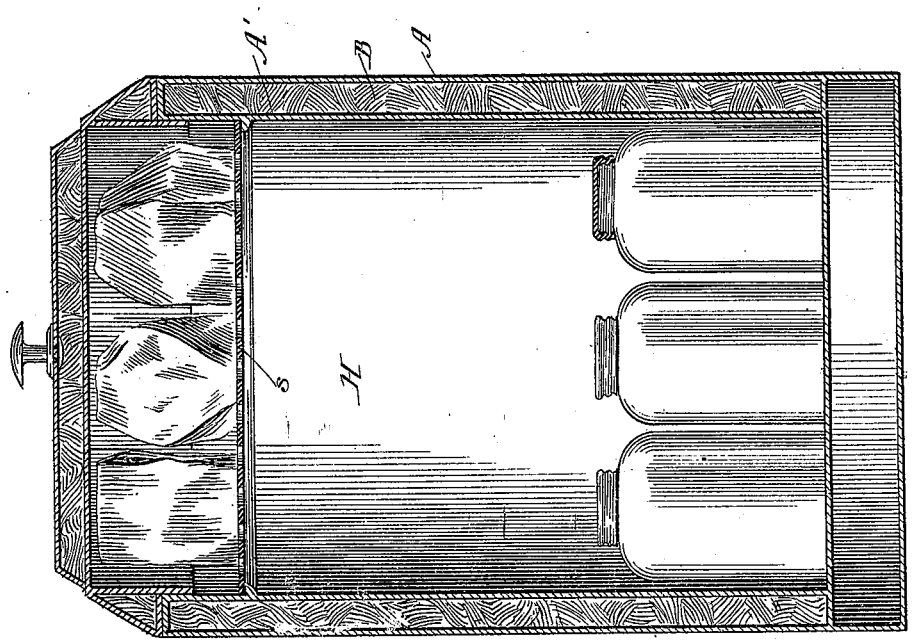
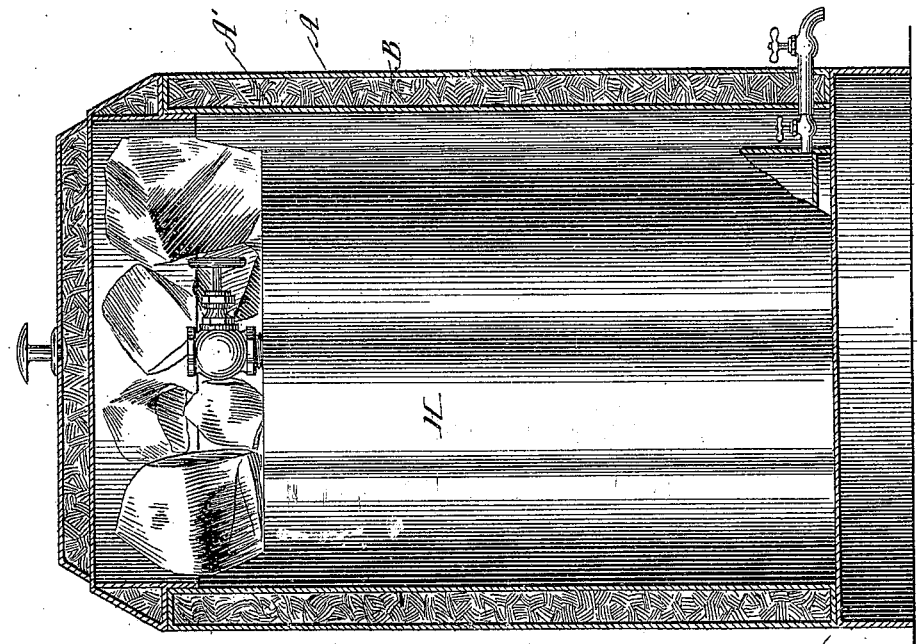
Witnesses:  
Frank J. Blanchard  
Louis Nolting.
Inventor:  
William C. Thayer  
By W. H. Doly & Co.  
Attorneys (No Model.)

W. C. THAYER.
PORTABLE REFRIGERATOR.

No. 333,264. Patented Dec. 29, 1885.

3 Sheets—Sheet 3.

Witnesses:
Frank J. Blanchard
Louis Nolting

Inventor:
William C. Thayer
By Coesen Lotz & Co.
Attorneys.

UNITED STATES PATENT OFFICE.

WILLIAM C. THAYER, OF CHICAGO, ILLINOIS, ASSIGNOR TO THE THAYER PORTABLE REFRIGERATOR COMPANY, OF SAME PLACE.

PORTABLE REFRIGERATOR.

SPECIFICATION forming part of Letters Patent No. 333,264, dated December 29, 1885.

Application filed April 21, 1885. Serial No. 162,943. (No model.)

*To all whom it may concern:*

Be it known that I, WILLIAM C. THAYER, a citizen of the United States of America, residing at Chicago, in the county of Cook and State of Illinois, have invented certain new and useful Improvements in Portable Refrigerators, of which the following is a specification, reference being had therein to the accompanying drawings.

My invention relates to an improved portable refrigerating device.

The object of the invention is to so construct such a device that the contents—such as milk, ginger-ale in suitable bottles, and other articles—may be thoroughly cooled and advantageously preserved in their normal condition, thus preventing them from spoiling.

To the accomplishment of the above the invention consists in providing the receptacle or refrigerating device, and also its cover, with double walls, the spaces between such walls being filled with some suitable non-heat-conducting material.

The invention further consists in forming the cover for such refrigerators in the shape of a box or ice-chest in which the ice or other cooling agent is contained, means being thus provided for readily removing the cooling agent when desired.

The invention further consists in forming the bottom of such top or cover box upon a double incline, with the apex at the lowest point and arranged to enter the liquid contained in the refrigerator, thereby cooling it thoroughly, or in forming such bottom on a double incline and providing it at its center with a downwardly-extending branch in the form of a tube closed at its lower end and adapted to enter the contents of the receptacle, and provided with a perforated cover which prevents the entrance of the ice into such tube, but at the same time is adapted to admit the water from such ice; or this bottom may be formed perfectly flat, and provided with a circumferential depression arranged with a perforated cover; and the invention further consists in providing a suitable cover or bag for the ice held in position by suitable hooks.

Further, the invention consists in forming suitable air-spaces between the upper end of the receptacle and its cover; and, further, in providing the box-shaped cover with a door through which access may be gained to its interior; also, in a novel catch or lock used; and, further, in forming suitable openings through the double wall of the receptacle through which the discharge-nozzle of an inclosed tank or the nozzle of suitable siphons may be passed.

Figure 8:
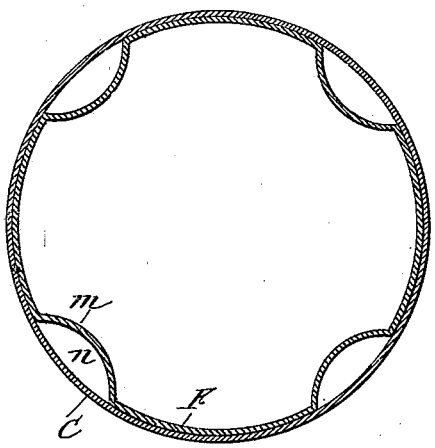
Figure 6:
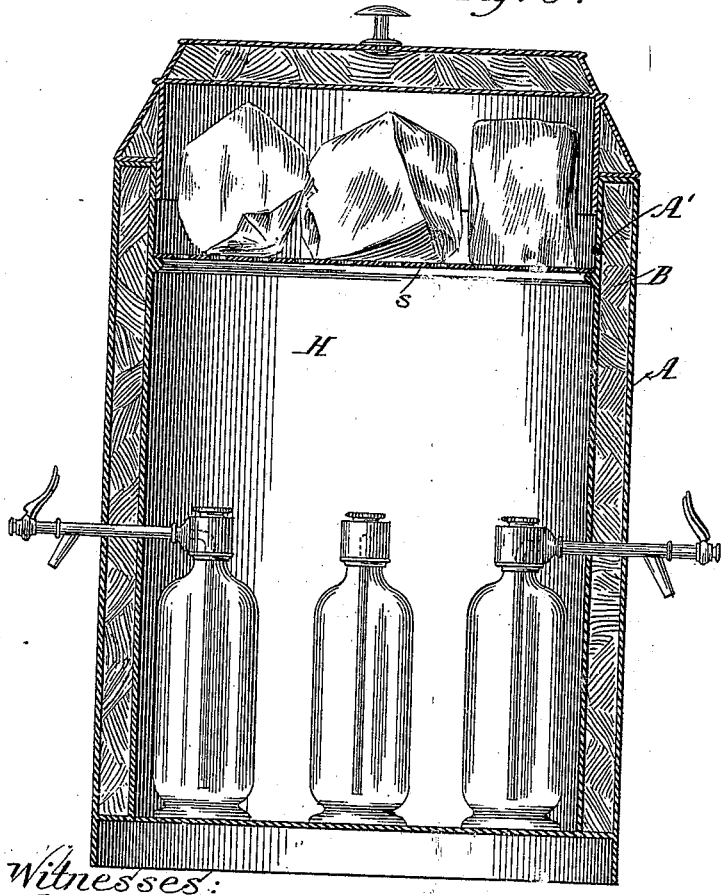

Reference will be made to the accompanying drawings, in which Figures 1, 2, 3 are sectional views showing different constructions of the box-shaped covers for the refrigerator; Figs. 4, 5, 6, similar views of arrangements wherein the ice is supported upon a perforated bottom or upon an inclosed tank; Figs. 7, 8, cross-sections of the device, and Fig. 9 a detail showing a catch employed.

Like letters refer to like parts in each view.

Referring now to Fig. 1, it will be seen that the main body of the refrigerator is formed of two walls, A A', between which a suitable non-heating-conducting packing, B, is placed. These two walls extend from the bottom of the device up to a point where the body ends and the neck commences, where they merge into one wall (marked C) and form the neck. The bottom of the refrigerator (marked D) is provided with a flange, $a$, through which and wall A and a ring, $b$, suitable bolts, $c$, are passed, the parts being thus securely held together. There is a second bottom, D', formed with inner wall, A', between which and bottom D there is a suitable space, as clearly shown. At its upper end the receptacle is provided with an opening, closed by a screw-threaded plug, $d$, and through which the contents are introduced into said receptacle without removing the cover. The contents may be drawn off through a suitable faucet, E, arranged as shown.

The cover shown in Fig. 1 consists of box F, provided upon its upper end and outer edge with an overlapping flange, $e$, adapted to encircle the upper edge of the neck. The bottom of cover F is formed with a circumferential depression, $f$, separated from the interior of the cover by a suitable perforated strip, $g$, whereby the ice is retained in the cover proper, while the drippings therefrom are allowed to flow into depression $f$. When the receptacle is filled, this depression is adapted to enter the contents, and the action of the drippings contained therein serves to cool the contents.

In Fig. 2 I have shown the bottom of the cover formed upon a double incline, with the apex at the lowest point. In such an arrangement the ice is placed upon a perforated bottom, $g'$, and the drippings allowed to fall into the space formed between such perforated bottom and the bottom proper of the cover.

In Fig. 3 the bottom is represented as formed upon a double incline and as provided at or about its center with a tube, $h$, into which the drippings fall, the ice being kept from such tube by a perforated piece, $k$. The cover F is provided upon its upper face with a removable cover, $l$, covering an opening through which the ice is inserted into the interior of cover F. The wall A is preferably corrugated, as shown clearly in Fig. 7, and the wall of cover F is provided with a series of depressions, $m$, by which arrangement suitable spaces, $n$, are formed between it and the neck.

Figure 9:
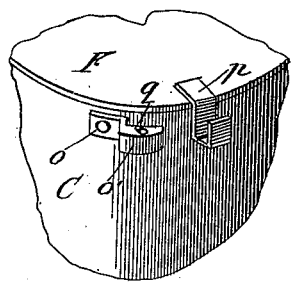

To secure cover F in place, the locking device shown in Fig. 9 is used. As shown in that figure, there is a strip, $o$, secured to the neck, said strip being bent at right angles twice, thus forming an arm, $o'$, between which and the neck a suitable space is left. A strip, $p$, is secured to the top of the cover, being bent over the edge thereof and carried down a suitable distance, where it is bent outwardly and then upwardly. By this construction, when the cover is suitably turned, one part of strip $p$ enters the space between arm $o'$ and the neck, while the outward and upward extensions of said arm $p$ serve to partly encircle said arm $o'$. Arm $o'$ is provided with a hole, $q$, and the outward extension of arm $p$ with a corresponding hole adapted to be in line with hole $q$ when the parts are in position to be locked. Any suitable wire or seal may be passed through these openings, and the cover securely held in place.

In Fig. 4 the cover is shown as formed with double side and top walls, with the spaces between them filled with a non-heat-conducting substance. As arranged in that figure, the contents are contained in an auxiliary tank, H, upon which the ice rests, said tank being provided with suitable filling and drawing-off devices.

In Fig. 5 the ice is shown as supported upon a perforated portion, $s$, supported upon a suitable flange formed upon the interior of the receptacle.

In Fig. 6 a similar arrangement for the ice is shown, and the refrigerator shown as adapted to use in connection with suitable siphons. The operating-tubes are passed through the walls of the refrigerator and operated from the outside.

A covering, $t$, for the ice is provided, as shown in Figs. 1, 2, 3, such covering being secured to suitable hooks, $v$.

What I claim is—

1. A portable refrigerator provided with a cover, both parts formed with double walls and interposed non-heat-conducting material, as set forth.

2. The combination, with a portable refrigerator, of a box-shaped cover provided with a doubly-inclined bottom, the apex of which is at its lowest point, as set forth.

3. The combination, with a portable refrigerator, of a box-shaped cover the bottom of which is provided with a depression, as set forth.

4. The combination, with a portable refrigerator and a box-shaped cover therefor, of a perforated plate mounted in said cover between its top and bottom, as set forth.

5. The combination, with a portable refrigerator and a box-shaped cover therefor, of a covering for the ice, and suitable hooks to hold such covering in place, as set forth.

6. In a portable refrigerator, an outer corrugated wall, in combination with a plain inner wall, as set forth.

7. In a portable refrigerator, the combination, with the plain neck thereof, of a box-shaped cover corrugated as described.

8. The combination, with a refrigerator, of siphons situated therein, the operating-tubes of the siphons passed through the walls of the refrigerator and operated from the outside, as set forth.

9. In a portable refrigerator, the combination, with a bent and perforated arm secured to the neck thereof, of a cover, a bent and perforated arm secured to the cover and arranged to partly encircle the arm secured to the neck, and a suitable sealing-wire passed through the perforations of the two arms, as set forth.

In testimony whereof I affix my signature in presence of two witnesses.

WILLIAM C. THAYER.

Witnesses:
M. J. CLAGETT,
LOUIS NOLTING.